(12) United States Patent
Amichai et al.

(10) Patent No.: US 8,549,478 B2
(45) Date of Patent: Oct. 1, 2013

(54) GRAPHICAL USER INTERFACE INPUT ELEMENT IDENTIFICATION

(75) Inventors: Nitsan Amichai, Rehovot (IL); Omer Barkol, Haifa (IL); Doron Shaked, Tivon (IL); Mani Fischer, Haifa (IL); Ayelet Pnueli, Haifa (IL); Sagi Schein, Haifa (IL); Michael Pogrebisky, Rishon Le-Zion (IL); Alexei Ledenev, Nes Ziona (IL); Ilan Shufer, Tel Aviv (IL); Vitali Greenberg, Yehud (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 505 days.

(21) Appl. No.: 12/629,107

(22) Filed: Dec. 2, 2009

(65) Prior Publication Data

US 2011/0131551 A1    Jun. 2, 2011

(51) Int. Cl.
*G06F 9/44* (2006.01)

(52) U.S. Cl.
USPC ............ 717/124; 717/125; 717/131; 717/135

(58) Field of Classification Search
USPC .................. 717/124, 125, 131, 135
See application file for complete search history.

(56) References Cited

U.S. PATENT DOCUMENTS 5,781,720 A * 7/1998 Parker et al. ............... 714/38.11

* cited by examiner

*Primary Examiner* — Qamrun Nahar

(57) ABSTRACT

Systems, methods, and other embodiments associated with graphical user interface input element identification are described. One example system identifies a graphical user interface (GUI) element through which an input to an application was received based on comparing images generated from data provided by the application. Data that describes the GUI element may then be provided.

15 Claims, 5 Drawing Sheets

GRAPHICAL USER INTERFACE INPUT ELEMENT IDENTIFICATION

BACKGROUND

An image of a graphical user interface (GUI) may include several GUI elements. Automated testing tools may be interested in understanding interactions between users and GUI elements. Automated testing is one tool that some companies use to ensure that new and/or updated applications function correctly. Automated testing can help designers evaluate an application's responses to various sequences of inputs without requiring a designer to step through sequences manually when the application is modified. Some conventional automated testing tools attempt to model object hierarchies of programming languages and/or communication protocols of applications to determine where and/or how to provide a pre-specified input to an application.

However, there are many cases where the object hierarchy may not be accessible to an automated testing application. For example, some web development applications (e.g., FLASH®, web 2.0) may not provide useful run time information. Similarly, when an automated testing application accesses applications through an image based protocol (e.g., remote desktop protocol (RDP)) run time information may not be accessible to a computer receiving data via the protocol. This is in part because it is sometimes difficult to identify with which element of a graphical user interface a user is attempting to interact. However, even if a programming language does provide usable run time information, the number of companies using the programming language may be so small that it would not be economical for a company supporting an automated testing application to model the object hierarchy of the programming language.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
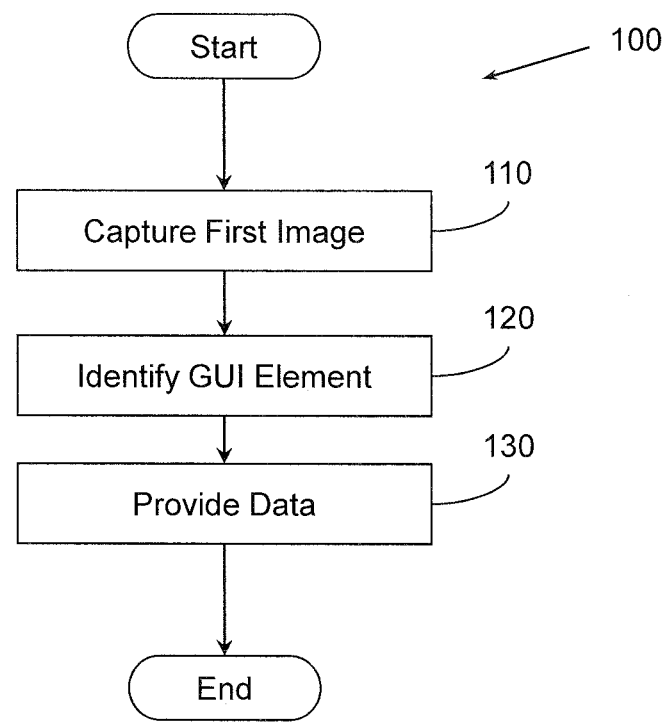
FIG. 1 illustrates an example embodiment of a method associated with graphical user interface input element identification.

Systems and methods associated with graphical user interface input element identification are described. One example method includes capturing a first image of a graphical user interface (GUI) of an application. The first image may be captured in response to detecting a user generated input to the application through the GUI. The method also includes identifying a GUI element based on the first image through which the input was received. The method also includes providing data identifying the GUI element.

In one example, providing the data identifying the GUI element may facilitate generating a test script that can be used in an application testing application. Generating the test script based on image data may facilitate application testing without modeling an object hierarchy of a programming language associated with the application. Thus, even if the application is built in a programming language that is not modeled, a test script may be generated that is able to simulate input for application testing purposes. Furthermore, because the script is generated based on image data, inputs may be provided to applications over image based protocols where an object hierarchy is not accessible.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read.

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Software", as used herein, includes but is not limited to, one or more executable instruction that cause a computer, processor, or other electronic device to perform functions, actions and/or behave in a desired manner. "Software" does not refer to stored instructions being claimed as stored instructions per se (e.g., a program listing). The instructions may be embodied in various forms including routines, algorithms, modules, methods, threads, and/or programs including separate applications or code from dynamically linked libraries.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

FIG. 1 illustrates an example embodiment of a method 100 associated with graphical user interface input element identification. At 110, method 100 includes capturing a first image of a graphical user interface (GUI) of an application. The first image may be captured in response to detecting a user generated input to the application through the GUI. In one example, the first image of the GUI may show a state of the GUI prior to the application receiving the user generated input. The first image and may be a member of a series of images generated based on data provided by the application. The application may provide the data in response to inputs. By way of illustration, an application may be in a first state. The first state may be associated with a first image that is being transmitted or has been transmitted. Upon detecting a mouse moving over a GUI element the application may transition to a second state and cause transmission of a second image describing the second state. For example, the second image may highlight the GUI element that the mouse is hovering over. Upon detecting a mouse down action, the application may transition to a third state and cause transmission of a third image describing the third state, and so forth. However, the second image may be a member of a series of images transmitted between the first image and the third image. Thus, in one example, capturing a first image at 110 may include selecting the second image from the series of images.

The user generated input may be, for example, a mouse down action, a mouse up action, an input from a peripheral device, a keyboard button press and so on. An input from a peripheral device may include a vocal input. Even though a vocal input may not be inherently graphical in nature, a person having ordinary skill in the art will recognize that a vocal input may still cause a application to modify a GUI and may even be associated with a specific GUI element. For example, a vision impaired person or a person with a spinal cord injury may input data into text boxes using vocal input, and a cellular telephone may be able to dial a specific telephone number in response to a vocal input.

At 120, method 100 includes identifying a GUI element based on the first image of the GUI. The GUI element may be a button, a radio button, a check box, a text input field, a hypertext link, and so on. A person having ordinary skill in the art will recognize other GUI elements and potentially groups of individual GUI elements that may be used to provide input to an application. The user generated input may have been received through the GUI element. At 130, method 100 includes providing data identifying the GUI element. In one example, providing data identifying the GUI element may include storing a test script. The test script may comprise data describing the user generated input. Data describing the user generated input may facilitate replaying the same or a similar input to the application at a later time. The test script may also comprise the data describing the GUI element. The data describing the GUI element may describe the application, the GUI, hierarchy information associated with the GUI element, a type associated with the GUI element, text near the GUI element, a region of the GUI containing the GUI element, a specific location of the GUI element in the GUI, ordering information about the GUI element, a spatial relationship to a nearby GUI element, and so on. Thus, the data describing the GUI element may facilitate finding the same or a similar GUI element in a GUI associated with the application. In one example, the data describing the GUI element may allow the GUI element to be found even if the GUI element is not in the same place in a subsequent image of the GUI. For example, a check box to enable email solicitations may be identifiable even if a region containing the check box were moved from the left side of a first version of the GUI to the right side of a subsequent version of the GUI. In one example, the method may comprise providing information to a user describing test script functionality (not shown). The information may be provided based on the data describing the GUI element and/or the user generated input. This may allow the user to examine and/or modify test scripts.

While FIG. 1 illustrates various actions occurring in serial, it is to be appreciated that various actions illustrated in FIG. 1 could occur substantially in parallel. By way of illustration, a first process could capture an image of a GUI, a second process could identify a GUI element, and a third process could provide data identifying the GUI element. While three processes are described, it is to be appreciated that a greater and/or lesser number of processes could be employed and that lightweight processes, regular processes, threads, and other approaches could be employed.

In one example, a method may be implemented as computer executable instructions. Thus, in one example, a computer-readable medium may store computer executable instructions that if executed by a machine (e.g., processor) cause the machine to perform method 100. While executable instructions associated with method 100 are described as being stored on a computer-readable medium, it is to be appreciated that executable instructions associated with other example methods described herein may also be stored on a computer-readable medium.

Figure 2:
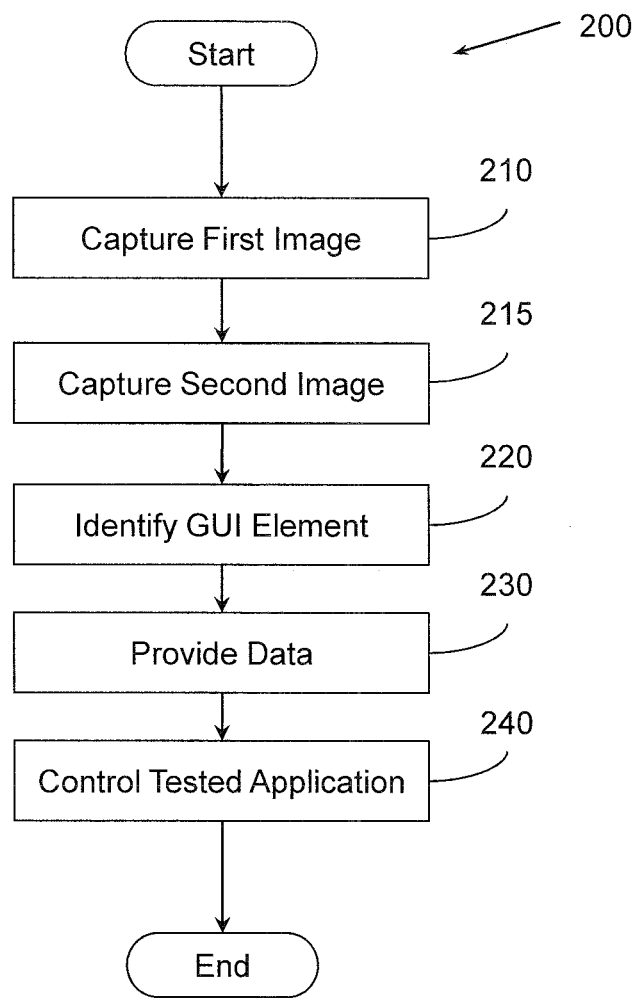
FIG. 2 illustrates an example embodiment of a method associated with graphical user interface input element identification.

FIG. 2 illustrates an example embodiment of a method 200 associated with image based application testing. Method 200 includes several actions similar to those described in relationship to method 100 (FIG. 1). For example, method 200 includes capturing a first image of a GUI at 210, identifying a GUI element based on the first image of the GUI at 220, and providing data identifying the GUI element at 230. However, method 200 includes an additional action.

At 215, method 200 includes capturing a second image of the GUI of the application. The second image of the GUI may show a state of the GUI during the application receiving the user generated input, a state of the GUI after the application has received the user generated input, and so forth. Thus, identifying the GUI element at 220 may also be based on the second image of the GUI. Identifying the GUI element may include identifying a location of a mouse pointer in an image, detecting differences between the first image and the second image, generating a third image based on the first image and the second image to highlight differences between the two images, and so on.

Method 200 includes, at 240, controlling the application to receive a simulated input based on the test script. Controlling the application to receive a simulated input may comprise capturing a third image of the GUI of the application. Controlling the application to receive a simulated input may also comprise identifying an input region of the GUI in the third image of the GUI based on the data describing the GUI element in the test script. The input region may be a GUI element. Controlling the application to receive a simulated input may also comprise providing the simulated input to the application through the input region. The simulated input may be computed as a function of the user generated input. The simulated input may be generated to be identical to the user generated input. However, a person having ordinary skill in the art may recognize there may be situations where it is appropriate to provide a simulated input that is different from the user generated input.

By way of illustration, an application testing program may be configured to simulate requests generated by users of a web forum application. However, some conventional web forum applications require that individual users be associated with a unique identification. This may make it expensive to manually generate test scripts if the goal is to simulate interactions generated by multiple users. Instead, the software testing application may be configured with a series of example inputs and automatically modify the example inputs (e.g., iteratively, randomly) to simulate interactions of different users.

In one example, controlling the application to receive a simulated input may facilitate analyzing load on a device containing the application. In another example, controlling the application to receive a simulated input may facilitate evaluating responses of the application to various sequences of input. Evaluating responses to various sequences of inputs may include checking to see that the application provides correct outputs in response to acceptable inputs. For example, a calculator application may be to determine that mathematical functions the calculator is designed to handle are evaluated correctly (e.g., 2+2=4). Evaluating responses to various sequences of inputs may include checking to see that errors do not occur when the application is presented inputs it does not know how to handle. For example, it may be valuable to test whether a calculator application instructed to divide by zero will crash the computer, crash the application, provide an error message, and so on.

Figure 3:
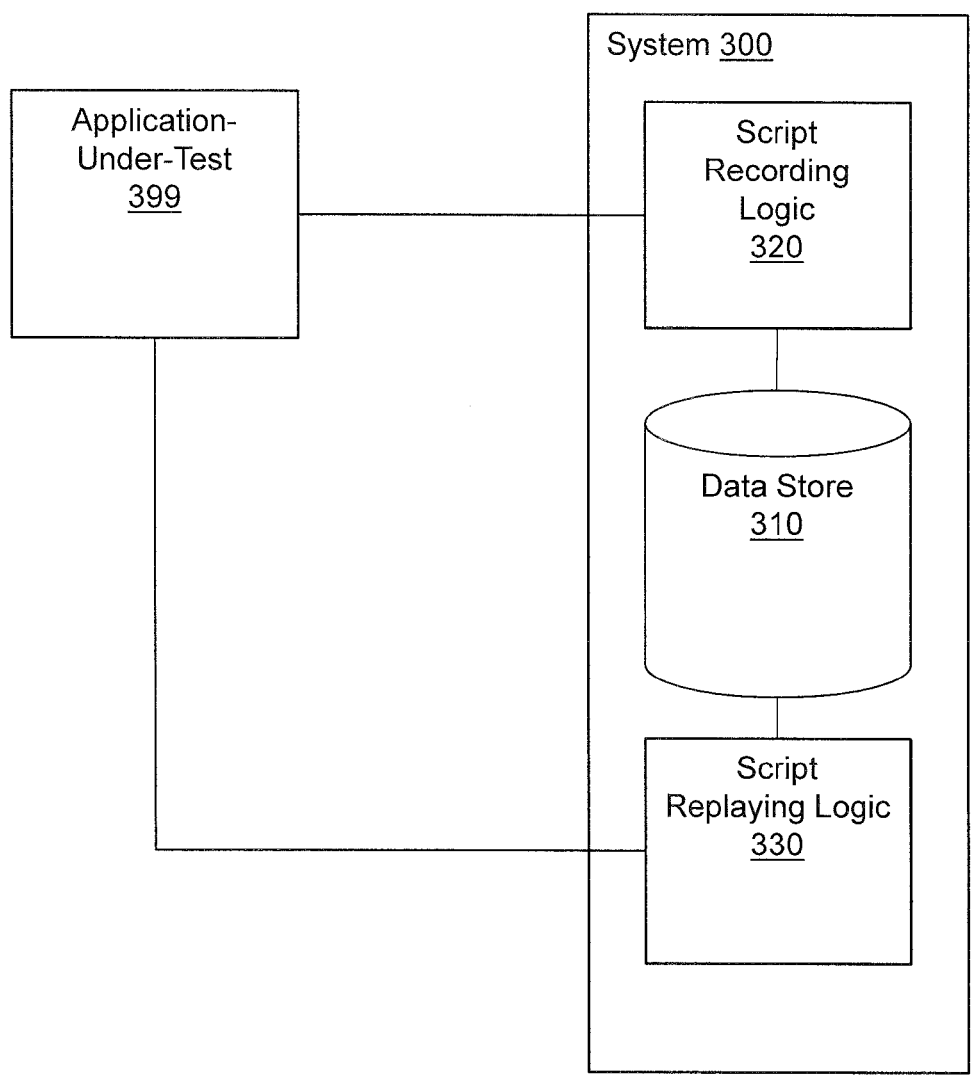
FIG. 3 illustrates an example embodiment of a system associated with graphical user interface input element identification.

FIG. 3 illustrates an example embodiment of a system 300 associated with graphical user interface input element identification. System 300 includes a data store 310. Data store 310 may store application testing instructions. An application testing instruction may identify a graphical user interface (GUI) element and an input to provide to an application-under-test 399 through the GUI element. System 300 also includes a script recording logic 320. Script recording logic 320 may generate an application testing instruction based on a screen image of a GUI of application-under-test 399. Script recording logic 320 may also store the application testing instructions in data store 310. Script recording logic 320 may generate the application testing instruction upon detecting an input to application-under-test 399 through the GUI. The application testing instruction may be generated to facilitate simulating user generated input to application-under-test 399 that is similar or identical to the input (e.g., simulating a mouse click).

System 300 also includes a script replaying logic 330. Script replaying logic 330 may locate a GUI element that is to receive a test input. The GUI element that is to receive the test input may be located in a screen image of a GUI of application-under-test 399. Script replaying logic 330 may provide input to application-under-test 399 through the GUI element that is to receive the test input and the test input may be identified in an application testing instruction stored in data store 310.

Figure 4:
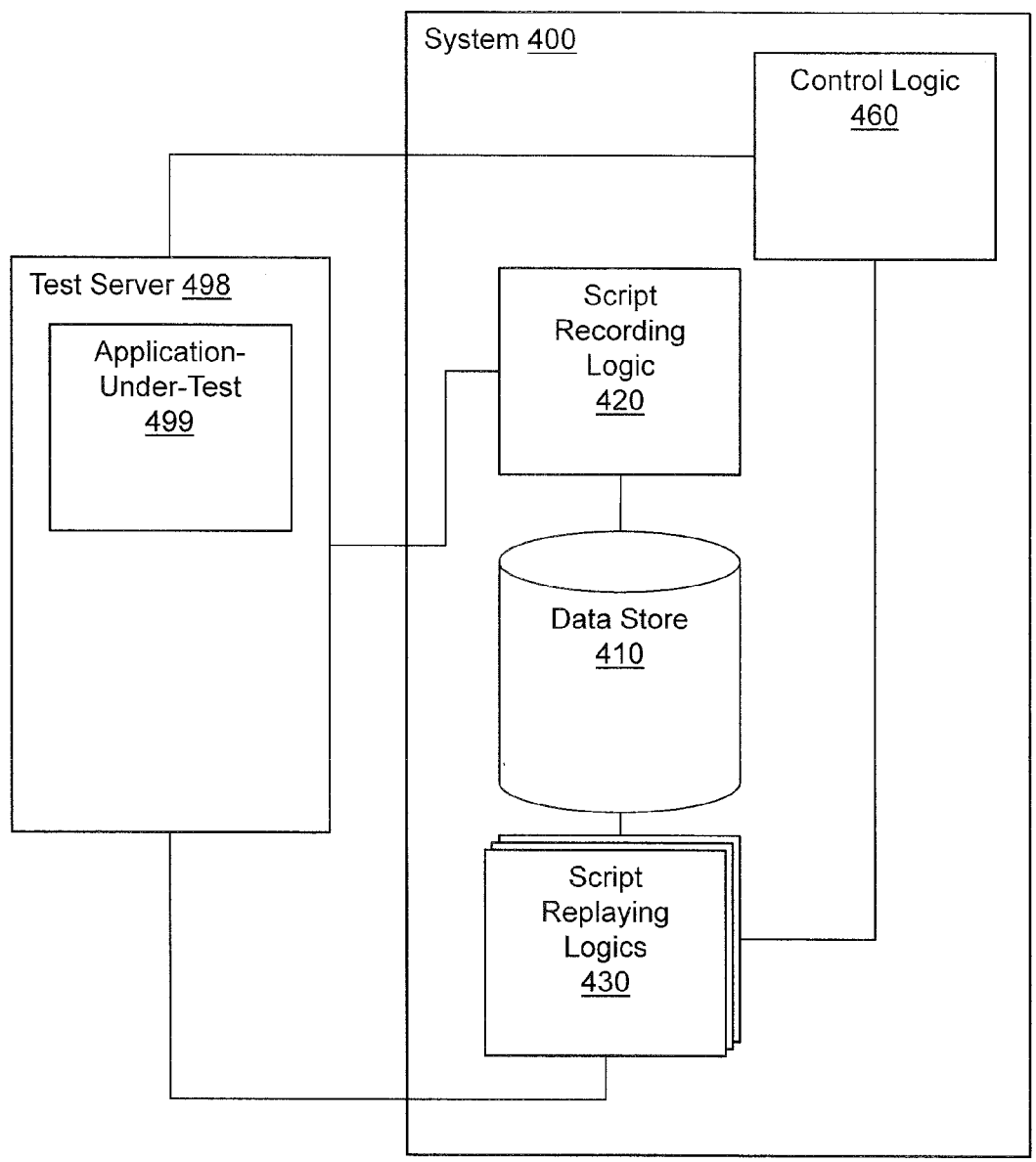
FIG. 4 illustrates an example embodiment of a system associated with graphical user interface input element identification.

FIG. 4 illustrates an example embodiment of a system 400 associated with graphical user interface input element identification. System 400 includes several elements similar to those described in relationship to system 300 (FIG. 3). For example, system 400 includes a data store 410, a script recording logic 420, and a script replaying logic(s) 430. However, system 400 includes an additional element. System 400 includes a control logic 460. Control logic 460 may initiate a set of script replaying logics 430. Control logic 460 may also monitor information associated with a test server 498 running an application-under-test 499, the application-under-test 499, members of the set of script replaying logics 430, and so on. In one example, control logic 460 may monitor a load on test server 498 generated by members of the set of script replaying logics 430. In another example, control logic 460 may monitor responses of application-under-test 499 to various sequences of input. Monitoring load on a test server and/or responses to various sequences of input may allow a user to determine whether the application-under-test satisfies design specifications. This may allow the user to determine whether more changes to the application-under-test are required before moving on to another stage of a development process.

Figure 5:
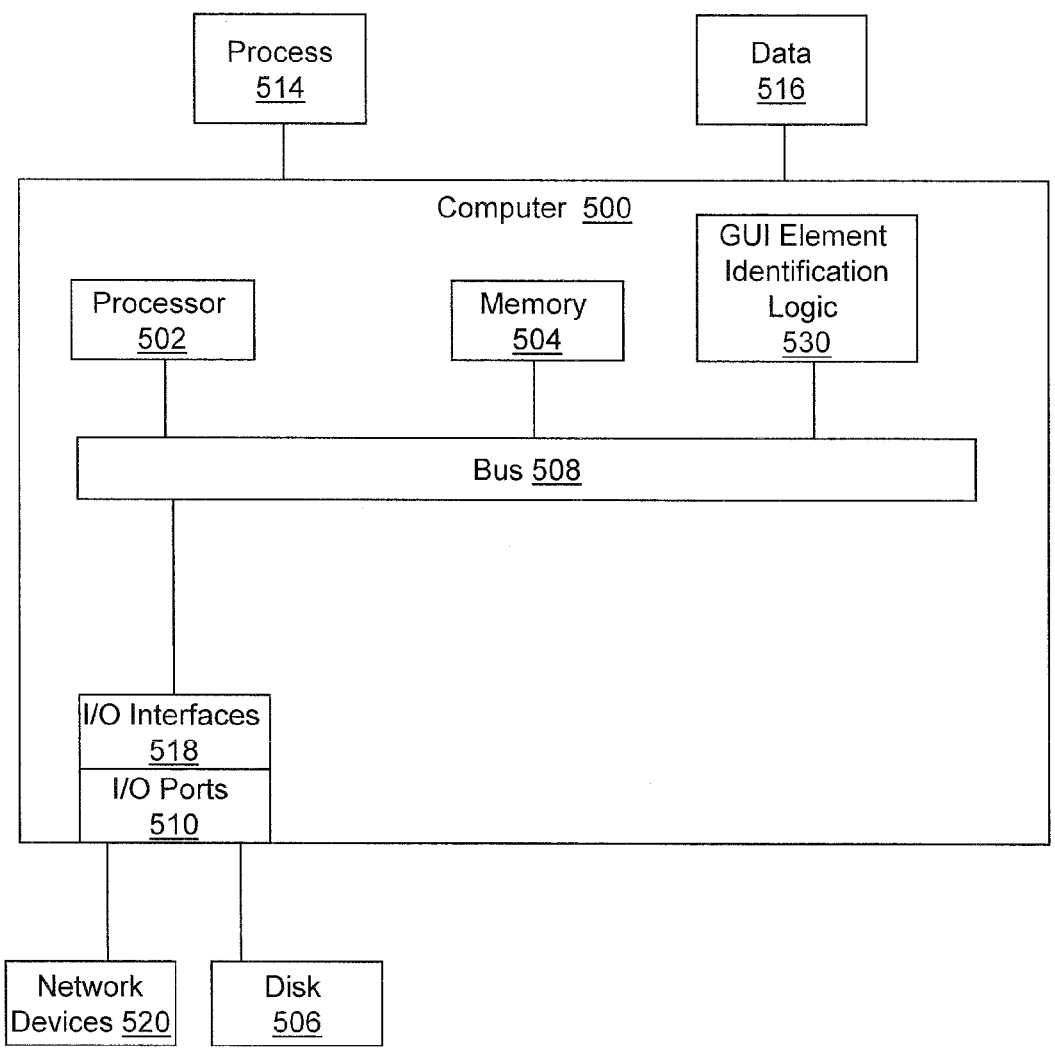
FIG. 5 illustrates an example embodiment of a computing environment in which example systems and methods, and equivalents, may operate.

FIG. 5 illustrates an example embodiment of a computing device in which example systems and methods described herein, and equivalents, may operate. The example computing device may be a computer 500 that includes a processor 502, a memory 504, and input/output ports 510 operably connected by a bus 508. In one example, the computer 500 may include a graphical user interface (GUI) element identification logic 530. In different examples, GUI element identification logic 530 may be implemented in hardware, software, firmware, and/or combinations thereof. While GUI element identification logic 530 is illustrated as a hardware component attached to the bus 508, it is to be appreciated that in one example, GUI element identification logic 530 could be implemented in the processor 502.

GUI element identification logic 530 may provide means (e.g., hardware, software in execution, firmware) for identifying a GUI element through which an input to an application was received. The GUI element may be identified based on images generated from data provided by the application. The means may be implemented, for example, as an ASIC. The means may also be implemented as computer executable instructions that are presented to computer 500 as data 516 that are temporarily stored in memory 504 and then executed by processor 502. GUI element identification logic 530 may also provide means (e.g., hardware, software in execution, firmware) for providing data identifying the GUI element.

Generally describing an example configuration of the computer 500, the processor 502 may be a variety of various processors including dual microprocessor and other multi-processor architectures. A memory 504 may include volatile memory (e.g., random access memory (RAM)) and/or non-volatile memory (e.g., read only memory (ROM)).

A disk 506 may be operably connected to the computer 500 via, for example, an input/output interface (e.g., card, device) 518 and an input/output port 510. The disk 506 may be, for example, a magnetic disk drive, a solid state disk drive, a floppy disk drive, an optical disk, a tape drive, a Zip drive, a flash memory card, a memory stick, and so on. The memory 504 can store a process 514 and/or a data 516, for example. The disk 506 and/or the memory 504 can store an operating system that controls and allocates resources of the computer 500.

The bus 508 may be a single internal bus interconnect architecture and/or other bus or mesh architectures. While a single bus is illustrated, it is to be appreciated that the computer 500 may communicate with various devices, logics, and peripherals using other busses (e.g., peripheral component internet express (PCIE), 1394, universal serial bus (USB), Ethernet). The bus 508 can be types including, for example, a memory bus, a memory controller, a peripheral bus, an external bus, a crossbar switch, and/or a local bus.

The computer 500 may interact with input/output devices via the i/o interfaces 518 and the input/output ports 510. Input/output devices may be, for example, a keyboard, a microphone, a pointing and selection device, cameras, video cards, displays, the disk 506, the network devices 520, and so on. The input/output ports 510 may include, for example, serial ports, parallel ports, and USB ports.

The computer 500 can operate in a network environment and thus may be connected to the network devices 520 via the i/o interfaces 518, and/or the i/o ports 510. Through the network devices 520, the computer 500 may interact with a network. Through the network, the computer 500 may be logically connected to remote computers. Networks with which the computer 500 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

To the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A tangible, non-transitory, computer-readable storage medium storing computer-executable instructions that when executed by a computer cause the computer to perform a method, the method comprising:
    capturing a first image of a graphical user interface (GUI) of an application in response to detecting a user generated input to the application through the GUI;
    identifying, based at least in part on the first image of the GUI, a GUI element through which the user generated input was received; and
    providing data describing the GUI element.

2. The tangible, non-transitory, computer-readable medium of claim 1, comprising capturing a second image of the GUI of the application in response to detecting the user generated input to the application through the GUI, where identifying the GUI element is also based on the second image of the GUI.

3. The tangible, non-transitory, computer-readable medium of claim 2, where providing data identifying the GUI element comprises storing a test script, where the test script comprises data describing the user generated input and the data describing the GUI element.

4. The tangible, non-transitory, computer-readable medium of claim 1, where the first image of the GUI shows a state of the GUI prior to the application receiving the user generated input.

5. The tangible, non-transitory, computer-readable medium of claim 2, where the second image of the GUI shows a state of one or more of, the GUI during the application receiving the user generated input, and the GUI after the application has received the user generated input.

6. The tangible, non-transitory, computer-readable medium of claim 2, where the first image and the second image are members of a series of images generated based on data provided by the application, where the application provides the data in response to inputs.

7. The tangible, non-transitory, computer-readable medium of claim 1, where the user generated input is one or more of, a mouse down action, a mouse up action, an input from a peripheral device, and a keyboard button press.

8. The tangible, non-transitory, computer-readable medium of claim 3, the method comprising:
controlling the application to receive a simulated input based on the test script.

9. The tangible, non-transitory, computer-readable medium of claim 8, where controlling the application to receive a simulated input comprises:
capturing a third image of the GUI of the application;
identifying an input region of the GUI in the third image of the GUI based on the data describing the GUI element in the test script; and
providing the simulated input to the application through the input region, where the simulated input is computed as a function of the user generated input.

10. The tangible, non-transitory, computer-readable medium of claim 8, where the method comprises controlling the application to receive a simulated input to analyze load on a device containing the application.

11. The tangible, non-transitory, computer-readable medium of claim 8, where the method comprises controlling the application to receive a simulated input to evaluate responses of the application to various sequences of input.

12. The tangible, non-transitory, computer-readable medium of claim 1, where the data describing the GUI element describes one or more of, the application, the GUI, hierarchy information associated with the GUI element, a type associated with the GUI element, text adjacent to the GUI element, a region of the GUI containing the GUI element, a specific location of the GUI element, ordering information about the GUI element, and a spatial relationship to a nearby GUI element.

13. A system, comprising:
a processor; and
a memory device comprising executable code that, when executed by the processor, causes the processor to:
store application testing instructions, where an application testing instruction identifies a graphical user interface (GUI) element and an input to provide to an application-under-test through the GUI element;
generate an application testing instruction based on a screen image of a GUI of the application-under-test and to store the application testing instruction in the data store, where the application testing instruction is generated upon detecting an input to the application-under-test through the GUI;
locate a GUI element that is to receive a test input, the GUI element being located in a screen image of a GUI of the application-under-test; and
provide input to the application-under-test through the GUI element that is to receive the test input, where the GUI element that is to receive the test input and the test input are identified in an application testing instruction from the data store.

14. The system of claim 13, comprising:
a control logic to initiate a set of script replaying logics and to monitor information associated with one or more of, a test server running the application-under-test, the application-under-test, and members of the set of script replaying logics.

15. A system, comprising:
a processor; and
a memory device comprising executable code that, when executed by the processor, causes the processor to:
identify a graphical user interface (GUI) element through which an input to an application was received based on comparing images generated from data provided by the application; and
provide data describing the GUI element.

* * * * *